(12) United States Patent
Kim (10) Patent No.: US 12,496,906 B2
(45) Date of Patent: Dec. 16, 2025

(54) VIBRATION DAMPING DEVICE FOR A HEAD UP DISPLAY DRIVING MODULE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/441,373

(22) Filed: Feb. 14, 2024

(65) Prior Publication Data

US 2024/0294068 A1 Sep. 5, 2024

(30) Foreign Application Priority Data

Mar. 2, 2023 (KR) .................. 10-2023-0027902

(51) Int. Cl.
*B60K 35/231* (2024.01)

(52) U.S. Cl.
CPC ........ *B60K 35/231* (2024.01); *B60K 2360/84* (2024.01)

(58) Field of Classification Search
None
See application file for complete search history.

(56) References Cited

U.S. PATENT DOCUMENTS

2021/0364780 A1* 11/2021 Kim ................ B60K 35/00

FOREIGN PATENT DOCUMENTS

KR 20140148398 A * 12/2014

OTHER PUBLICATIONS

Translation of KR-20140148398-A into English, Kobayashi et al. (Year: 2014).*

* cited by examiner

*Primary Examiner* — Brian M Butcher
(74) *Attorney, Agent, or Firm* — Morgan, Lewis & Bockius LLP (57) ABSTRACT

A vibration damping device for a head-up display driving module, the device comprising: a power generating unit configured to a first damper having a predetermined thickness based on a shape corresponding to a motor mount to which a motor is fixed and a second damper fitted into an open hole of a damper mount disposed on top of the motor mount; and a power transmission unit configured to transmit power of the motor by rotating a lead screw extended and coupled to a rotating shaft of the motor.

14 Claims, 6 Drawing Sheets

VIBRATION DAMPING DEVICE FOR A HEAD UP DISPLAY DRIVING MODULE

CROSS-REFERENCE TO RELATED APPLICATION

The present application claims the benefit under 35 USC § 119(a) of Patent Application No. 10-2023-0027902, filed on Mar. 2, 2023 in the Korean Intellectual Property Office, the entire disclosure of which is incorporated herein by reference for all purposes.

BACKGROUND

1. Field

The present disclosure relates to a vibration damping device for a head up display driving module

2. Description of the Related Art

The contents described in this section merely provide background information related to the present disclosure and do not constitute prior art.

A head-up display is a device that displays an image containing vehicle speed, fuel level, road guidance information, etc. on a windshield, which is a front window of a vehicle. The head-up display is generally configured to display on the windshield display information projected from a picture generating unit.

A conventional head-up display rotates an aspheric mirror using a motor. In this case, the aspheric mirror is in point contact with a power transmission unit to receive torque. When the aspheric mirror makes point contact with the power transmission unit, external force due to vibration and friction of the motor is concentrated on one point, which may cause wear and geometric transformation.

As the RPM (Revolution Per Minute) of the motor increases, motor vibration, that is, acceleration generated by the motor increases. When the motor is driven based on a high RPM, the conventional head-up display fails to attenuate the vibration of the motor, which may result in noise. In addition, backlash occurs between a link and a lead screw which move horizontally based on the torque of the motor.

The backlash generated between the link and the lead screw affects the operation and reliability of the head-up display driving module. That is, there is a problem in that an error occurs in power transmission of the head-up display driving module, and vibration and noise are generated due to an external impact or the like.

SUMMARY

In view of the above, one embodiment of the present disclosure provides a vibration damping device for a head-up display driving module which is capable of reducing vibration and noise of a motor by disposing a first damper and a second damper between a motor mount and a damper mount.

Another embodiment of the present disclosure provides a vibration damping device for a head-up display driving module which is capable of preventing motor deflection and increasing damping capacity by disposing three or more third dampers between the motor mount and the damper mount.

The objects to be achieved by the present disclosure are not limited to the objects mentioned above, and other objects not mentioned will be clearly understood by those skilled in the art from the description below.

According to one embodiment of the present disclosure, the vibration damping device for the head-up display driving module can reduce vibration and noise of the motor by disposing the first damper and the second damper between the motor mount and the damper mount.

According to another embodiment of the present disclosure, the vibration damping device for the head-up display driving module can prevent the motor deflection and increase damping capacity by disposing three or more third dampers between the motor mount and the damper mount.

DETAILED DESCRIPTION

Figure 1:
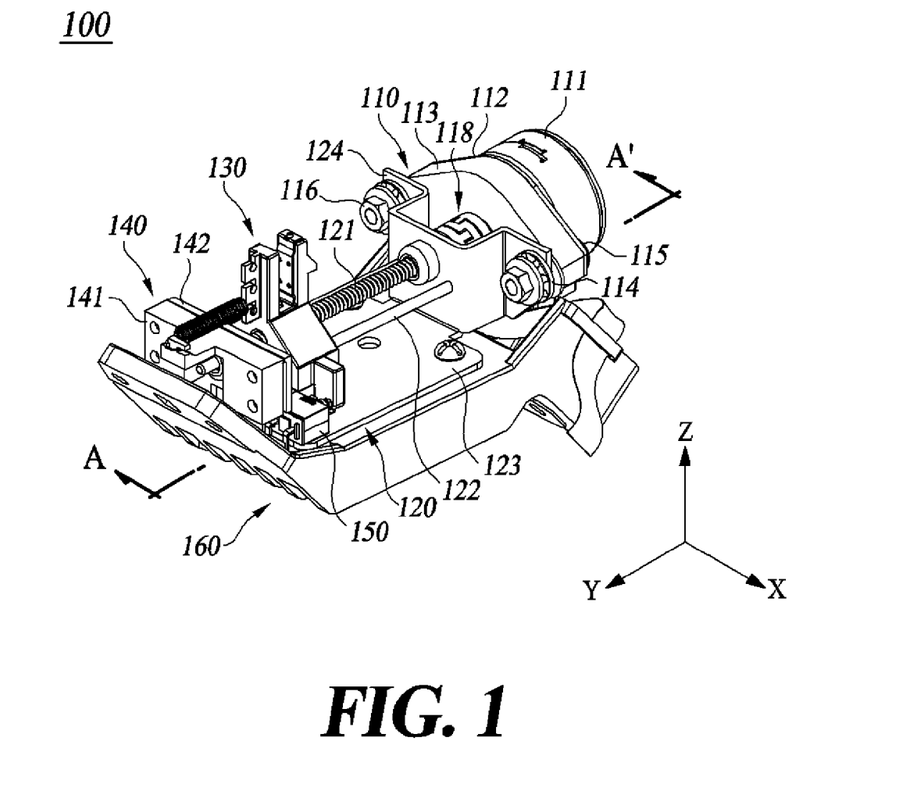
FIG. 1 is a perspective view showing a configuration of a vibration damping device for a head-up display driving module according to one embodiment of the present disclosure.

FIG. 1 is a perspective view showing a configuration of a vibration damping device, for a head-up display driving module, according to one embodiment of the present disclosure.

Figure 2:
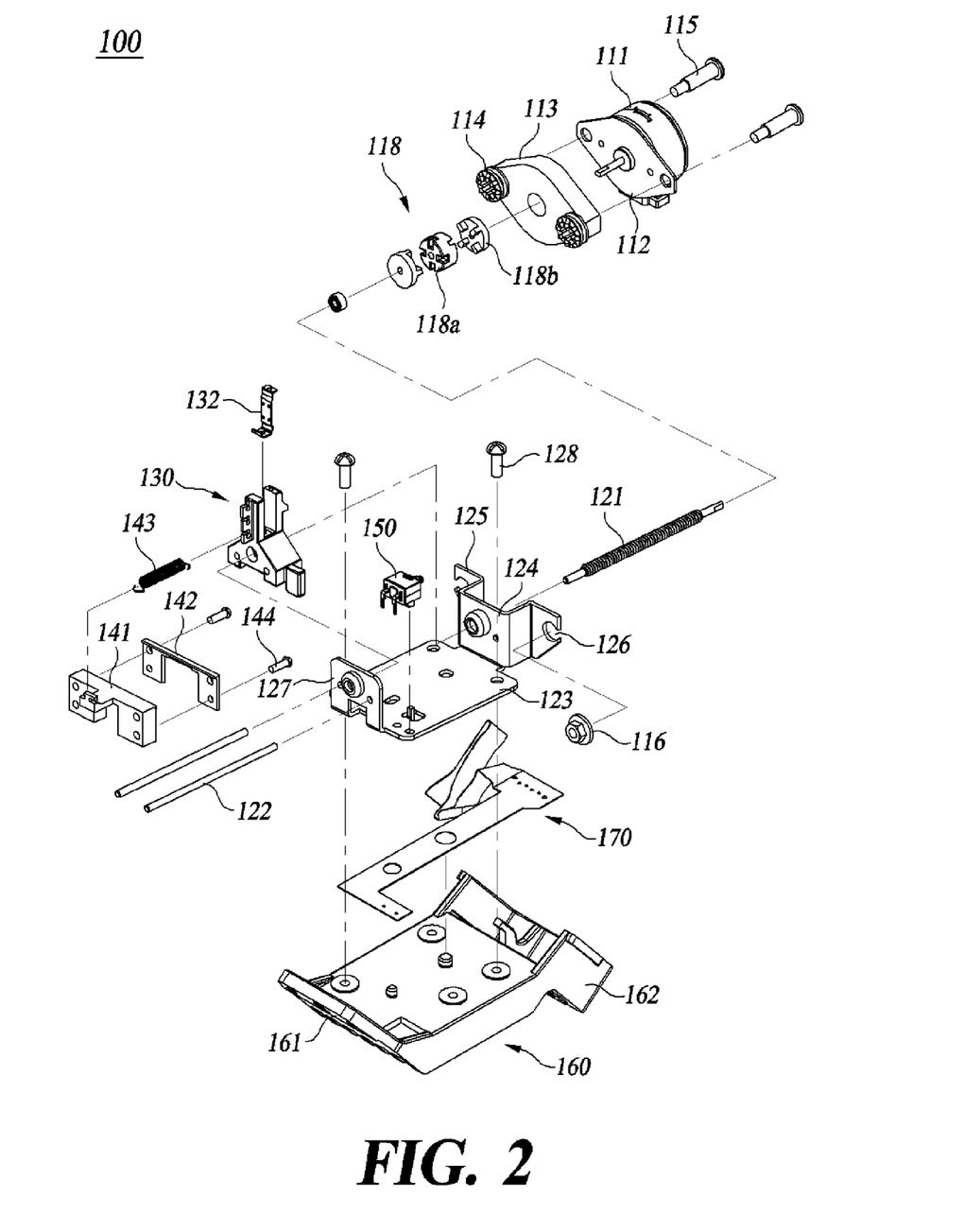
FIG. 2 is an exploded perspective view showing the configuration of the vibration damping device for the head-up display driving module according to one embodiment of the present disclosure.

FIG. 2 is an exploded perspective view showing the configuration of the vibration damping device for the head-up display driving module according to one embodiment of the present disclosure.

Referring to FIGS. 1 and 2, a head-up display driving module 100 includes all or some of a power generating unit 110, a power transmission unit 120, a link unit 130, an elastic unit 140, and a driving module housing 160.

The head-up display driving module 100 rotates an aspherical mirror (not shown) by moving up and down the link unit 130 based on torque of a motor 111.

The power generating unit 110 may include all or some of the motor 111, a motor mount 112, a first damper 113, a second damper 114, and a shoulder bolt 115, and a flexible coupling 118.

The motor 111 may include a lead screw 121 forming a rotation axis. In this case, the lead screw 121 is connected to a rotating shaft of the motor 111 in an extension direction to be rotatable, and may be integrated with the power generating unit 110 or may have an attachable/detachable structure that can be assembled to and separated from the power generating unit 110. In this case, the flexible coupling 118 connects the rotating shaft of the motor 111 and the lead screw 121. The flexible coupling 118 may attenuate vibration generated from the rotating shaft of the motor 111.

The motor mount 112 includes a plurality of through-holes (not shown) to allow the motor 111 to be fixed in the drive module housing 160. The motor mount 112 may be integrally formed with the motor 111.

The first damper 113 has a preset thickness based on a shape corresponding to a shape of the motor mount 112. In this case, the preset thickness of the first damper 113 means the thickness in the y-axis direction.

When the motor 111 is driven, vibration generated from the motor 111 is transmitted to the first damper 113 through the motor mount 112. In this case, the first damper 113 can reduce noise generated in the driving module 100 by attenuating the vibration of the motor 111 through the motor mount 112.

The second damper 114 may include a plurality of second dampers. The second damper 114 has a circular cross-sectional area and a predetermined thickness. The second damper 114 is disposed in contact with an upper surface of the first damper 113. When the second damper 114 is disposed in contact with the upper surface of the first damper 113, the second damper 114 is preferably disposed to correspond to each of a plurality of through-holes formed in the first damper 113. The first damper 113 and the second damper 114 may be integrally formed.

The first damper 113 and the second damper 114 are coupled to the motor mount 112 using shoulder bolts 115 and nuts 116.

The power transmission unit 120 includes all or some of a lead screw 121, a guide shaft 122, a lead screw bracket 123, a lower mount 124, and a damper mount 125, an open hole 126, an upper mount 127, a tapping screw 128, and a lead screw central axis 129.

The lead screw bracket 123 is seated on a body of the driving module housing 160. The lead screw bracket 123 may be coupled to the driving module housing 160 using the tapping screw 128.

The lead screw bracket 123 may include a plurality of holes (not shown). In this case, the plurality of holes of the lead screw bracket 123 may be a long-slotted hole and a short-slotted hole. The long-slotted hole and the short-slotted hole are preferably formed to correspond to a plurality of locating pins (not shown) formed in the driving module housing 160. Accordingly, the locating pins of the driving module housing 160 are coupled to the long-slotted hole and the short-slotted hole of the lead screw bracket 123, thereby preventing the lead screw bracket 123 from rotating on the driving module housing 160.

The lead screw bracket 123 is provided with the lower mount 124 and the upper mount 127. The lower mount 124 and the upper mount 127 are formed to extend perpendicular (in the z direction) to the lead screw bracket 123.

The lower mount 124 includes a through-hole (not shown) through which the lead screw 121 passes, and a bearing (not shown) is inserted into the through-hole. The lower mount 124 may have at a lower side portion an accommodation space in which the flexible coupling 118 is accommodated.

The damper mount 125 is formed to extend from the lower mount 124. The damper mount 125 is formed with the open hole 126 so that the second damper 114 can be fitted in the open hole 126. The open hole 126 is formed in a hollow shape in which an inner circumferential surface of the open hole 126 is partially opened in a circumferential direction thereof.

The upper mount 127 receives a longitudinal end portion of the lead screw 121 to be rotatable. The upper mount 127 is coupled with an elastic fixing part 141 and an elastic mount 142 using bolts 144. Therefore, they include a plurality of through-holes through which the bolts 144 are fitted.

The guide shaft 122 is extended parallel to the lead screw 121 between the lower mount 124 and the upper mount 127 while being spaced apart from the lead screw 121. The guide shaft 122 may be coupled to the link unit 130 by passing through a portion of the link unit 130. When the link unit 130 moves up and down along the lead screw 121 in a moving range, the guide shaft 122 may guide the link unit 130 so that the link unit 130 moves up and down without rotating.

The link unit 130 includes a main body (not shown), a slot (not shown), and a clip 132.

A central through-hole (not shown) is formed in a center portion of the main body of the link unit 130 so that the lead screw 121 is fitted into the central through-hole. In the central through-hole (not shown) formed in the main body of the link unit 130, a screw thread corresponding to a screw thread of the lead screw 121 is formed. Accordingly, the link unit 130 moves up and down as the lead screw 121 rotates.

The slot of the link unit 130 extends from the main body and has a 'U' shape with one side open. The clip 132 is made of a 'U' shape corresponding to the open side of the slot and is snap-fitted into the slot. In this case, it is preferable that the clip 132 is configured to be detachably fitted in the slot.

The link unit 130 may be provided with a first hook (not shown), a second hook (not shown), and a third hook (not shown), at an upper end thereof. One end of an elastic member 143 may be connected to any one of the first hook, the second hook, and the third hook.

The elastic unit 140 includes all or some of an elastomer fixing part 141, an elastomer mount 142, and an elastic member 143.

The elastomer fixing part 141 is disposed in contact with an upper end of the upper mount 127.

The elastomer fixing part 141 includes a locking protrusion (not shown). The locking protrusion is formed as a 'L'-shaped protrusion so that a part of the elastomer fixing part 141 protrudes in the y-axis direction and one end of the elastic member 143 can be engaged therewith.

The elastic member 143 may be a spring. One end of the elastic member 143 may be fixed to the locking protrusion, and the other end thereof may be fixed to any one of the first hook, the second hook, and the third hook.

The elastic mount 142 is disposed in contact with a rear side of the upper mount 127 so that the elastomer fixing part 141 is fixed to the upper mount 127. The elastomer fixing part 141, the upper mount 127 and the elastic body mount 142 are coupled using the bolts 144.

The motor 111 is installed at a central portion of a body of the driving module housing 160.

The drive module housing 160 includes an upper housing 161 and a lower housing 162. The upper housing 161 and the lower housing 162 are respectively formed on upper and lower portions of the drive module housing 160. The upper housing 161 and the lower housing 162 are inclined in a diagonal direction with respect to the body of the driving module housing 160.

The lower housing 162 is coupled with a cable slit (not shown). In this case, the cable slit is coupled to a conductive wire connected to the motor 111, that is, a flexible cable 170. The flexible cable 170 can be installed in all directions on the left and right sides of the motor 111.

Each of the first hook, the second hook, and the third hook provided to the link unit 130 is formed on a longitudinal axis separated from the lead screw central axis 129 by a predetermined distance. The first hook, the second hook, and the third hook are sequentially formed on the upper surface of the slot of the link unit 130 in the z-axis direction. Accordingly, as one end of the elastic member 143 is fixed to the locking protrusion and the other end of the elastic member 143 is fixed to any one of the first hook, second hook, and third hook, the elastic force is varied.

The first hook is formed on a first longitudinal axis spaced apart from the lead screw central axis 129 by a first vertical distance L1. When one end of the elastic member 143 is fixed to the locking protrusion and the other end of the elastic member 143 is fixed to the first hook, the elastic force of the elastic member 143 may be, for example, $\alpha$ N/m.

The second hook is formed on a second longitudinal axis spaced apart from the lead screw central axis 129 by a second vertical distance L2. When one end of the elastic member 143 is fixed to the locking protrusion and the other end of the elastic member 143 is fixed to the second hook, the elastic force of the elastic member 143 may be, for example, $\beta$ N/m.

The third hook is formed on a third longitudinal axis spaced apart from the lead screw central axis 129 by a third vertical distance L3. When one end of the elastic member 143 is fixed to the locking protrusion and the other end of the elastic member 143 is fixed to the third hook, the elastic force of the elastic member 143 is, for example, $\gamma$ N/m. In this case, all of the elastic forces $\alpha$, $\beta$, and $\gamma$ respectively generated as the other end of the elastic member 143 is fixed to the first hook, the second hook, and the third hook have positive values, and they have a magnitude relationship of $\alpha<\beta<\gamma$. Accordingly, the link unit 130 and the elastic unit 140 according to one embodiment of the present disclosure can eliminate backlash for loads of different aspheric mirrors by using one elastic member 143.

Figure 3:
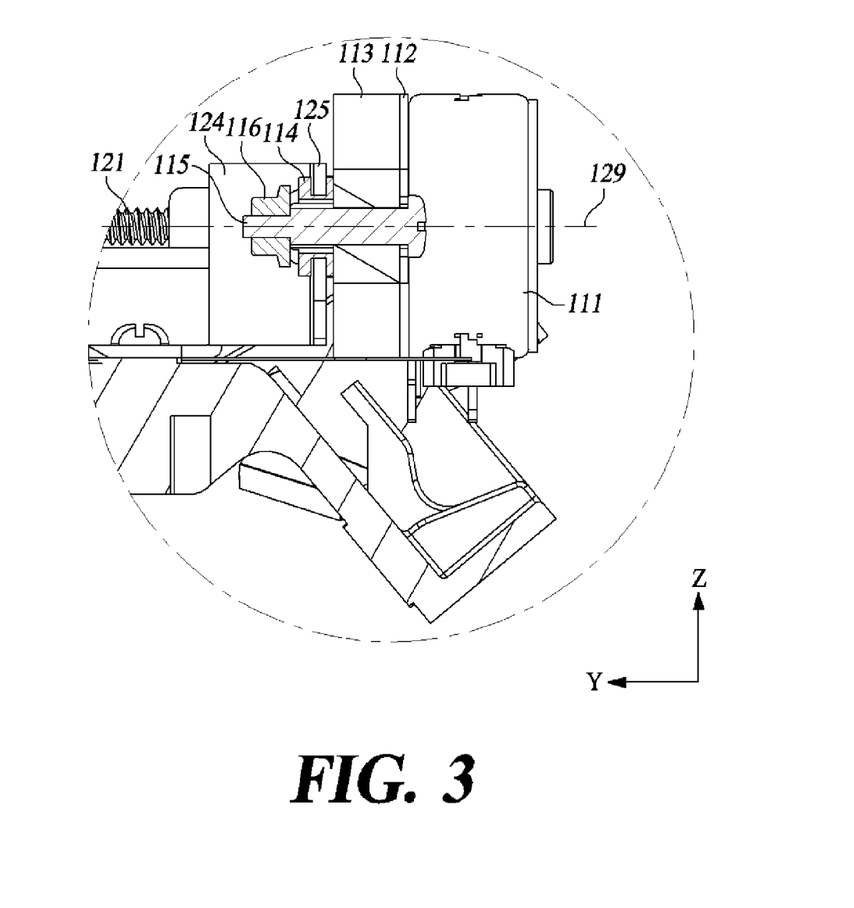
FIG. 3 is a cross-sectional view taken along line A-A' of FIG. 1, which is viewed from the right side.

FIG. 3 is a cross-sectional view taken along line A-A' of FIG. 1, which is viewed from the right side.

Referring to FIGS. 1, 2 and 3, the first damper 113 is disposed in contact with the motor mount 112. The second damper 114 is fitted into the open hole 126 formed in the damper mount 125. The first damper 113 and the second damper 114 are simultaneously coupled using the shoulder bolts 115 and the nuts 116.

An amount of compression of the first damper 113 and the second damper 114 is determined according to a length of a shoulder of the shoulder bolt 115. The shoulder bolt 115 includes a head, a shoulder and a thread. In this case, the thread is a part of the bolt that receives the nut 116. The nut 116 is coupled onto the thread of shoulder bolt 115. Accordingly, as the length of the shoulder of the shoulder bolt 115 decreases, the length of the thread onto which the nut 116 is coupled increases. Conversely, as the length of the shoulder of shoulder bolt 115 increases, the length of the thread onto which the nut 116 is coupled decreases. For example, as the shoulder of the shoulder bolt 115 becomes shorter, the amount of compression of the first damper 113 and the second damper 114 increases. Conversely, as the shoulder of the shoulder bolt 115 becomes longer, the amount of compression of the first damper 113 and the second damper 114 decreases.

Figure 4:
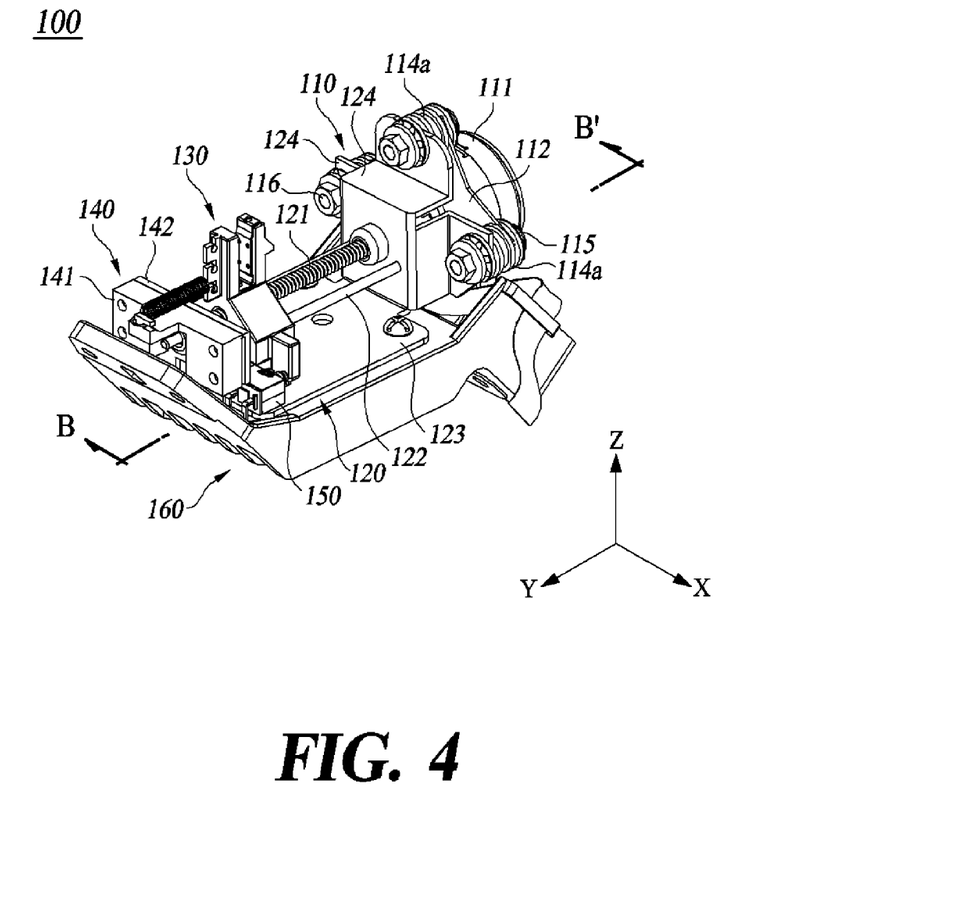
FIG. 4 is a perspective view showing a configuration of a vibration damping device for a head-up display driving module according to another embodiment of the present disclosure.

FIG. 4 is a perspective view showing the configuration of a vibration damping device, for a head-up display driving module, according to another embodiment of the present disclosure.

Figure 5:
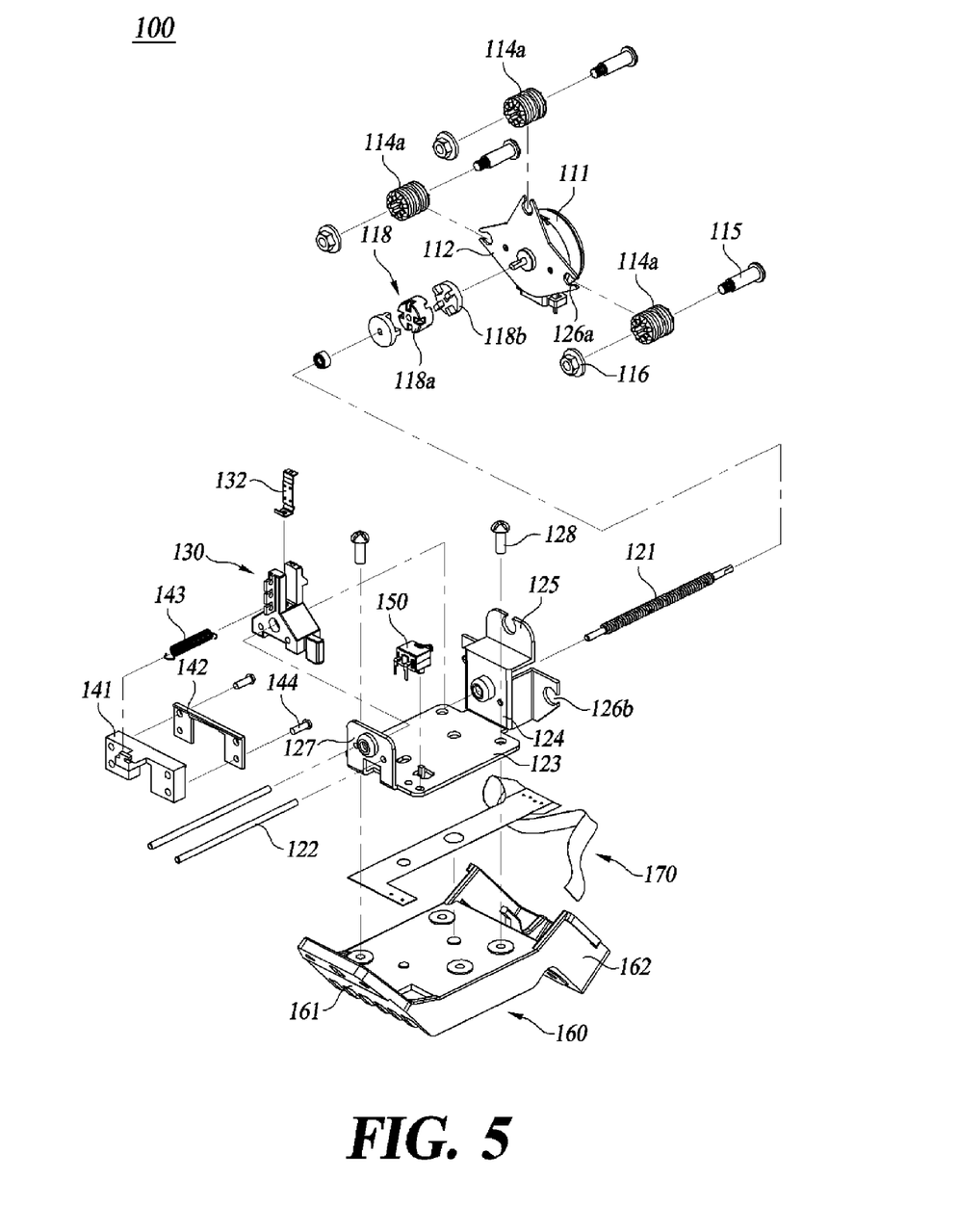
FIG. 5 is an exploded perspective view showing the configuration of the vibration damping device of the head-up display driving module according to another embodiment of the present disclosure.

FIG. 5 is an exploded perspective view showing the configuration of the vibration damping device for the head-up display driving module according to another embodiment of the present disclosure.

Figure 6:
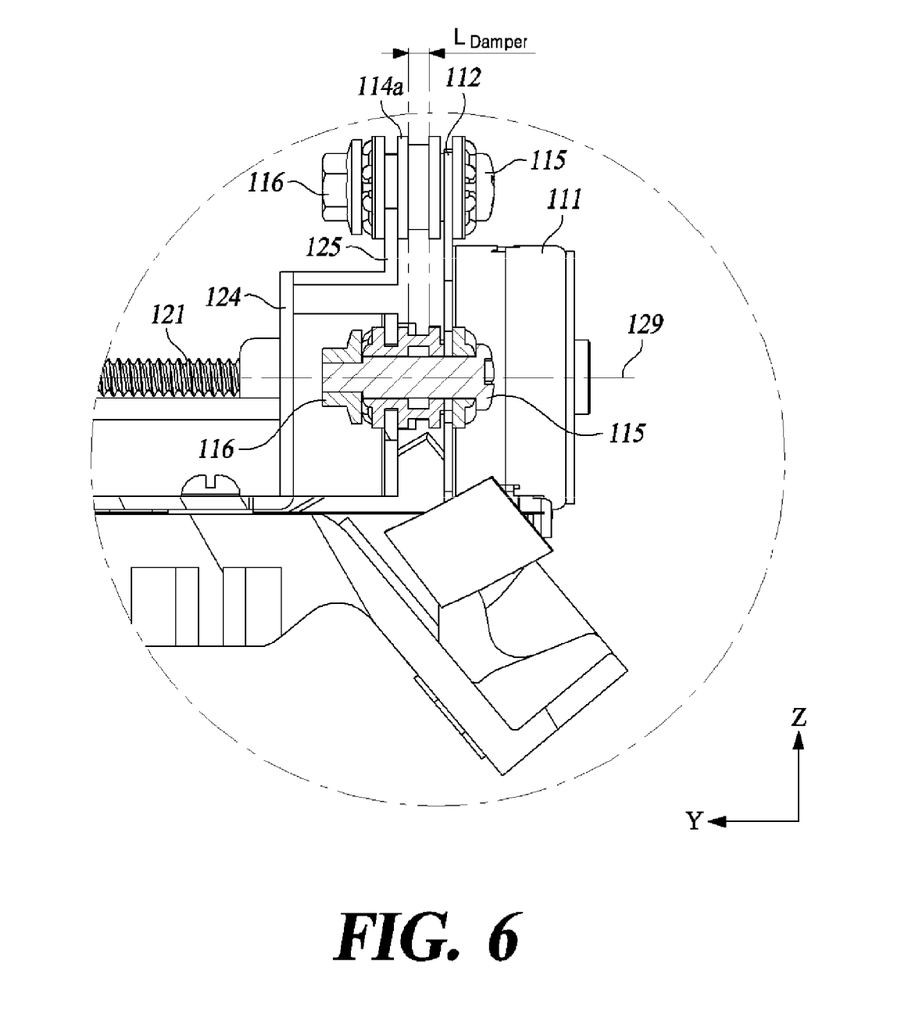
FIG. 6 is a cross-sectional view taken along line B-B' of FIG. 4, which is viewed from the right side.

FIG. 6 is a cross-sectional view taken along line B-B' of FIG. 4, which is viewed from the right side.

Referring to FIGS. 4 to 6, the head-up display driving module 100 according to another embodiment of the present disclosure has a structure for damping vibration and noise of the motor 111 as in the above-described embodiment of the present disclosure and a structure for eliminating the backlash of the lead screw 121, but a damping structure of the power generating unit 110 and a structure of the damper mount 125 of the power transmission unit 120 are different from those in the above-described embodiment of the present disclosure.

Hereinafter, the redundant description of the above-described contents will be omitted and differences will be described.

The power generating unit 110 according to another embodiment of the present disclosure includes all or some of a motor 111, a motor mount 112, a third damper 114a, a shoulder screw 115, and a flexible coupling 118.

The third damper 114a may be a double damper. In this case, the double damper may be a damper having a shape in which the second damper 114 according to one embodiment of the present disclosure described above is double-coupled.

The motor mount 112 and the damper mount 125 each extend in the x direction, the −x direction, and the z direction. The motor mount 112 and the damper mount 125 each include open holes 126a and 126b for coupling the third damper 114a. Accordingly, the open holes 126a and 126b are respectively formed in the motor mount 112 and the damper mount 125, for example, at three locations. In this case, each pair of the open holes 126a and 126b is formed on the same y-axis.

The third damper 114a may be coupled to the motor mount 112 and the damper mount 125. For example, the third damper 114a is coupled to the open holes 126a and 126b formed in the motor mount 112 and the damper mount 125, respectively. When the third damper 114a is simultaneously coupled to the motor mount 112 and the damper mount 125, a damping force of the third damper 114a varies depending on a length LDamper of the third damper 114a. For example, the damping force increases as the length LDamper of the third damper 114a increases. Conversely, the damping force decreases as the length LDamper of the third damper 114a decreases.

The third damper 114a structurally separates the lead screw bracket 123 and the motor 111. Accordingly, the third damper 114a can attenuate vibration of the motor 111 transmitted to the lead screw bracket 123.

According to one embodiment, by arranging the first damper 113 and the second damper 114 between the motor mount 112 and the damper mount 125 in the head-up display driving module, the vibration and noise of the motor 111 can be reduced.

According to another embodiment, by arranging three or more third dampers 114a between the motor mount 112 and the damper mount 125 in the head-up display driving module 100, deflection due to the self-weight of the motor 111 can be prevented.

What is claimed is:

1. A vibration damping device for a head-up display driving module, the device comprising:
   a power generating unit including a motor, a motor mount to which the motor is fixed, a first damper having a predetermined thickness and having a substantially same shape as an entire outer contour of a body of the motor mount, and a second damper; and a power transmission unit including a damper mount disposed on top of the motor mount, and configured to transmit power of the motor by rotating a lead screw extended and coupled to a rotating shaft of the motor, wherein the second damper is fitted into an open hole included in the damper mount.

2. The vibration damping device of claim 1, wherein the first damper and the second damper are coupled to each other between the motor mount and the damper mount using a shoulder bolt and a nut, and an amount of compression of the first damper and the second damper varies as a fastening force of the shoulder bolt and the nut varies.

3. The vibration damping device of claim 1, wherein the first damper and the second damper are configured to structurally separate the motor and the damper mount from each other and to attenuate vibrations generated from the motor.

4. The vibration damping device of claim 1, wherein the first damper and the second damper are different from each other in at least one of a shape or a size.

5. The vibration damping device of claim 1, wherein the first damper and the second damper are coupled to each other in an axial direction of the motor.

6. The vibration damping device of claim 5, wherein the second damper is disposed in contact with one surface of the first damper that is substantially perpendicular to the axial axis.

7. The vibration damping device of claim 6, wherein the second damper is configured in a plurality of second dampers spaced apart from each other on the one surface of the first damper.

8. A vibration damping device for a head-up display driving module, the device comprising:
a power generating unit including a motor, a motor mount disposed at an upper end of the motor, and a third damper; and
a power transmission unit including a lead screw, a lead screw bracket, and a damper mount disposed at a lower end of the lead screw bracket, and configured to transmit power of the motor by rotating the lead screw extended and coupled to a rotating shaft of the motor, wherein the third damper includes a first groove and a second groove that are fitted into a first open hole included in the motor mount and a second open hole included in the damper mount, respectively, such that a length-varying portion between the first and second grooves of the third damper is disposed between the motor mount and the damper mount, and remaining portions of the third damper are disposed outside of both of the motor mount and the damper mount in an axial direction of the motor.

9. The vibration damping device of claim 8, wherein the third damper is coupled between the motor mount and the damper mount using a shoulder bolt and a nut, and an amount of compression of the third damper varies as a fastening force of the shoulder bolt and the nut varies.

10. The vibration damping device of claim 8, wherein the third damper is configured to structurally separate the motor and the damper mount from each other and to damp vibrations generated from the motor.

11. The vibration damping device of claim 8, wherein each of the first open hole and the second open hole is formed in plural defined on at least three different locations in the motor mount or the damper mount along a circumferential direction of the lead screw.

12. The vibration damping device of claim 9, wherein a portion of the remaining portions of the third damper is disposed between the motor mount and a head of the shoulder bolt, and another portion of the third damper is disposed between the damper mount and the nut.

13. The vibration damping device of claim 11, wherein some of the at least three different locations are angled less than 180 degrees about a center axis of the lead screw.

14. The vibration damping device of claim 11, wherein two of the at least three different locations are respectively located at opposite sides of the motor mount or the damper mount in a first direction perpendicular to a center axis of the lead screw, and a remaining one of the at least three different locations is located at an upper side of the motor mount or the damper mount in a second direction perpendicular to the center axis of the lead screw but different from the first direction.

* * * * *